United States Patent
Tham et al.

(10) Patent No.: US 11,255,218 B2
(45) Date of Patent: Feb. 22, 2022

(54) METHOD FOR STARTING UP A GAS TURBINE ENGINE OF A COMBINED CYCLE POWER PLANT

(71) Applicant: Siemens Energy Global GmbH & Co. KG, Munich (DE)

(72) Inventors: Kok-Mun Tham, Oviedo, FL (US); Christian Keune, Heiligenhaus (DE); Nicolas Benjamin Wappler, Düsseldorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/963,620

(22) PCT Filed: Feb. 20, 2018

(86) PCT No.: PCT/US2018/018776
§ 371 (c)(1),
(2) Date: Jul. 21, 2020

(87) PCT Pub. No.: WO2019/164475
PCT Pub. Date: Aug. 29, 2019

(65) Prior Publication Data
US 2021/0062677 A1    Mar. 4, 2021

(51) Int. Cl.
*F01D 19/00* (2006.01)
*F01K 13/02* (2006.01)
*F02C 9/54* (2006.01)

(52) U.S. Cl.
CPC .............. *F01D 19/00* (2013.01); *F01K 13/02* (2013.01); *F02C 9/54* (2013.01); *F05D 2220/32* (2013.01);
(Continued)

(58) Field of Classification Search
CPC . F01D 19/00; F01K 13/02; F02C 9/54; F05D 2220/32; F05D 2220/72; F05D 2260/85; Y02E 20/16
See application file for complete search history.

(56) References Cited

U.S. PATENT DOCUMENTS

| | | |
|---|---|---|
| 6,364,602 B1 | 4/2002 | Andrew et al. |
| 6,912,856 B2 | 7/2005 | Morgan et al. |

(Continued)

FOREIGN PATENT DOCUMENTS

JP    H07310505 A    11/1995

OTHER PUBLICATIONS

PCT International Search Report and Written Opinion of International Searching Authority dated Nov. 13, 2018 corresponding to PCT International Application No. PCT/US2018/018776 filed Feb. 20, 2018.

*Primary Examiner* — Jesse S Bogue

(57) ABSTRACT

The invention relates to a method for starting up a gas turbine engine of a combined cycle power plant. The method includes applying load to the gas turbine engine and increasing the load until a predetermined combustor firing temperature is reached, while keeping the adjustable inlet guide vanes in a start position adapted to reduce the mass flow of air into the compressor; further increasing the load of the gas turbine engine while opening the adjustable inlet guide vanes and keeping the predetermined combustor firing temperature constant until the inlet guide vanes reach an end position adapted to increase the mass flow of air into the compressor; further increasing the load of the gas turbine engine while keeping the adjustable inlet guide vanes in the end position until a predetermined load of the gas turbine engine is reached.

5 Claims, 3 Drawing Sheets

Figure 1:
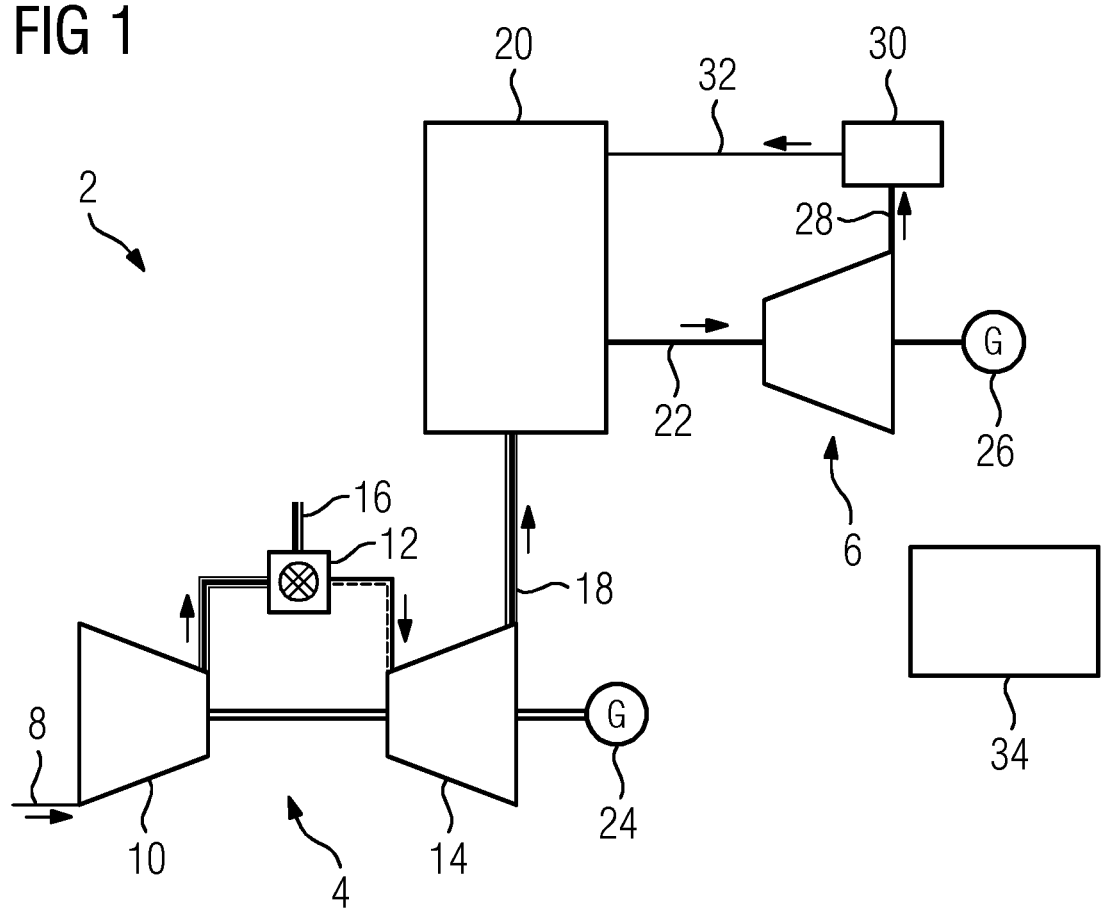

(52) U.S. Cl.
CPC ...... *F05D 2220/72* (2013.01); *F05D 2260/85* (2013.01)

(56) References Cited

U.S. PATENT DOCUMENTS

| | | | |
|---|---|---|---|
| 9,523,313 B2 | 12/2016 | Kim et al. | |
| 10,287,988 B2 * | 5/2019 | Asati | F02C 9/28 |
| 10,330,015 B2 * | 6/2019 | Harper | F02C 7/26 |
| 10,408,135 B2 * | 9/2019 | Engler | F02C 9/28 |
| 2004/0045300 A1 | 3/2004 | Dovali-Solis | |
| 2010/0175385 A1 * | 7/2010 | Plant | F02C 6/18 |
| | | | 60/773 |
| 2014/0331686 A1 * | 11/2014 | Gulen | F01K 23/10 |
| | | | 60/783 |
| 2016/0010566 A1 * | 1/2016 | Bottcher | F01K 23/10 |
| | | | 60/773 |
| 2016/0333731 A1 * | 11/2016 | Zhang | F02C 9/28 |
| 2017/0089267 A1 * | 3/2017 | Harper | F02C 7/26 |
| 2017/0191426 A1 | 7/2017 | Scipio et al. | |
| 2018/0010526 A1 | 1/2018 | Mori et al. | |

\* cited by examiner

METHOD FOR STARTING UP A GAS TURBINE ENGINE OF A COMBINED CYCLE POWER PLANT The present invention relates to a method for starting up a gas turbine engine of a combined cycle power plant, the gas turbine engine including a compressor, a combustor and a turbine, the compressor providing compressed air to the combustor for combustion with a fuel to produce a working fluid and the turbine receiving the working fluid to produce power; the compressor comprising adjustable inlet guide vanes, the adjustable inlet guide vanes being adjustable between a fully closed position for minimizing the mass flow of air into the compressor and a fully open position for providing the maximum mass flow of air into the compressor.

Furthermore, the invention relates to a gas turbine engine and a combined cycle power plant with such gas turbine engine.

During startup of a combined cycle power plant, the gas turbine portion of the plant is started before the steam turbine portion. During startup, there is a relatively rapid increase in the flow rate of the exhaust from the gas turbine as it accelerates to operating speed. Thereafter, the exhaust gas flow rate remains relatively constant except for the effect of modulating the adjustable inlet guide vane of the compressor. After the gas turbine reaches operating speed, the temperature of the exhaust gas gradually increases as the firing temperature of the gas turbine is increased up to the level required to produce the desired power output. However, the rate of increase in load and temperature of the gas turbine exhaust is constrained by thermal transient stress limits in the components of the steam turbine and the balance of plant, including the heat recovery steam generator (HRSG) that is exposed to the hot exhaust gas stream.

US 2004/045300 A1 teaches a method of starting a combined cycle power plant having a gas turbine portion comprising a compressor for producing compressed air and a turbine for producing exhaust gas, a heat recovery steam generator for producing steam by transferring heat from the exhaust gas to a flow of feed water, and a steam turbine for expanding the steam. The gas turbine portion is started to produce a flow of exhaust gas, a flow of injection air is produced and the flow of injection air is combined with the flow of exhaust gas to produce an augmented exhaust stream directed through the heat recovery steam generator to produce a flow of steam for starting the steam turbine. The air injection apparatus is utilized during startup of the plant to permit the gas turbine portion to be operated at a power level sufficiently high to ensure compliance with emissions regulations while at the same time not exceeding an upper exhaust temperature limit for warming the steam generator. The augmented exhaust stream allows the steam generator to more quickly generate enough steam to roll the steam turbine, thereby shortening the overall startup sequence.

From a combined cycle perspective, it is desirable to have higher gas turbine exhaust mass flow rate at lower exhaust temperature than low exhaust flow rate at higher temperature. A less severe exhaust temperature profile can help to reduce the stresses in the HRSG.

With regard to environmental compliance, exhaust emissions of combined cycle power plants must comply with legal requirements which are specific to the governmental authority over the geographic locality in which the plant operates. Generally, this necessitates that a minimum flame temperature be sustained during gas turbine operation.

One of the main challenges of combined cycle power plants is balancing the needs of minimal startup emissions on the one hand and a long life of the HRSG on the other hand. Lower exhaust temperature means opening the adjustable gas turbine inlet guide vanes to increase the compressor inlet flow, thus reducing the combustion temperature. This has the effect of increasing carbon monoxide (CO) emissions. Otherwise, the inlet guide vanes remain in the closed position for as long as possible during the ramp up, until an exhaust temperature limit is reached. This minimizes CO emissions but significantly reduces life of the critical HRSG components.

It is an objective of the present invention to enable starting up a gas turbine engine of a combined cycle plant in which the stress on the heat recovery steam generator components is limited while maintaining compliance with the local environmental regulations.

The objective of the invention is achieved by the independent claims. The dependent claims describe advantageous developments and modifications of the invention.

In accordance with the invention there is provided a method for starting up a gas turbine engine of a combined cycle power plant, the gas turbine engine including a compressor, a combustor and a turbine, the compressor providing compressed air to the combustor for combustion with a fuel to produce a working fluid and the turbine receiving the working fluid to produce power;

the compressor comprising adjustable inlet guide vanes, the adjustable inlet guide vanes being adjustable between a fully closed position for minimizing the mass flow of air into the compressor and a fully open position for providing the maximum mass flow of air into the compressor;

wherein the method comprises the steps of:
  step 1: applying load to the gas turbine engine and increasing the gas turbine engine load until a predetermined combustor firing temperature is reached, while keeping the adjustable inlet guide vanes in a start position adapted to reduce the mass flow of air into the compressor, whereby the predetermined combustor firing temperature is chosen to be an emission-compliant temperature,
  step 2: further increasing the load of the gas turbine engine while opening the adjustable inlet guide vanes and keeping the predetermined combustor firing temperature constant until the inlet guide vanes reach an end position adapted to increase the mass flow of air into the compressor,
  step 3: further increasing the load of the gas turbine engine while keeping the adjustable inlet guide vanes in the end position until a predetermined load of the gas turbine engine is reached.

The objective of the invention is further achieved by a gas turbine engine of a combined cycle power plant, comprising:
  a compressor, a combustor and a turbine, the compressor providing compressed air to the combustor for combustion with a fuel to produce a working fluid and the turbine receiving the working fluid to produce power;
  the compressor comprising adjustable inlet guide vanes, the adjustable inlet guide vanes being adjustable between a fully closed position for minimizing the mass flow of air into the compressor and a fully open position for providing the maximum mass flow of air into the compressor;
  a control unit for modulating the adjustable inlet guide vanes between a fully closed position for minimizing the mass flow of air into the compressor and a fully open position for providing the maximum mass flow of air into the compressor, the modulation of the adjustable inlet guide vanes depending on a combustor firing temperature, whereby the predetermined combustor firing temperature is an emission-compliant temperature.

The objective of the invention is finally achieved by a combined cycle power plant comprising:
- a gas turbine engine as described above, the gas turbine engine producing an exhaust fluid;
- a heat recovery steam generator receiving the exhaust fluid and producing steam;
- a steam turbine engine receiving the steam of the heat recovery steam generator.

Advantages relating to the described method may as well pertain to the gas turbine engine and/or the combined cycle power plant and vice versa.

When reading the following description of embodiments of the invention, it is to be understood that the concept of a combined-cycle system being "emission-compliant" refers to providing levels at least of CO (carbon monoxide), if applicable also of NOx (nitrous oxide) in the exhaust gas of the gas turbine which are within regulatory limits which may vary based on geographic area. The levels of pollutants produced in a gas turbine engine exhaust can be dependent on a number of parameters such as temperature, pressure ratio and combustion time. The concentration of CO is high at low-power conditions and decreases with increased power. Nitrous oxides are insignificant at low power and attain maximum values the highest temperature and pressure.

The essential idea of the present invention is to manage simultaneously both CO emissions and HRSG life by introducing a new loading profile when starting up the gas turbine engine in order to achieve a good, practical balance of these two combined cycle power plant characteristics.

In the first step, while applying load to the gas turbine engine and increasing the gas turbine engine load, the adjustable inlet guide vanes are kept in the start position adapted to reduce the mass flow of air into the compressor and hence reduce exhaust flow. The start position might be the fully closed position or any position close to the fully closed position of the adjustable inlet guide vanes in which the mass flow of air to the combustor is reduced. At low loads, the CO emissions are normally very high. Therefore, the goal is to keep the combustion temperature high and to minimize the exhaust flow, so that the CO production is low.

Loading in the closed position of the adjustable inlet guide vanes continues until a predetermined combustor firing temperature is reached. Hereby the predetermined combustor firing temperature is chosen so that it is compliant with the local CO emission requirements.

When the predetermined combustor firing temperature is reached, in the second step the load of the gas turbine engine is further increased while the adjustable inlet guide vanes are opening and the combustor firing temperature is kept constant until a predetermined end position of the adjustable inlet guide vanes is reached. The end position might be the fully open position or any position of the inlet guide vanes close to the fully open position, so that the mass flow of air to the combustor is increased. Opening the adjustable inlet guide vanes results in reducing the exhaust temperature. Yet, for this period of time the combustor firing temperature, which is important for the CO emissions, is maintained constant. This alleviates the HRSG components and at the same time the operation of the gas turbine engine remains emission-compliant.

In the third step the load of the gas turbine engine is increased, e.g. by increasing the fuel flow, while the inlet guide vanes are kept in the end position. In this operating region, the CO-compliant temperature is obtained even with fully open adjustable inlet guide vanes, hence this operation does not penalize CO emissions.

In summary, the method comprises running hot at the start for a limited period of time to minimize CO production, then operating the gas turbine engine just hot enough to reach and stay within the CO-compliant zone until reaching the predetermined load.

In one embodiment, the predetermined combustor firing temperature is between 1000° C. and 1850° C. This range is optimal for meeting the emission requirements in most geographical places.

In one further embodiment, in step 3 the predetermined load is a base load of the gas turbine engine, where base load is the condition of the gas turbine at a predetermined design exhaust temperature in combination with the design position of the inlet guide vanes. In this case an emission-compliant ramp of gas turbine engine is provided up to the base load, in which condition the turbine is operated most of the time.

In one embodiment, in step 1 the start position of the adjustable inlet guide vanes is the fully closed position. In another embodiment, in step 3 the end position of adjustable inlet guide vanes is the fully open position. In these cases the method for starting up the gas turbine engine is carried out under the optimal conditions based on the combination of step 1 and step 3.

Figure 2:
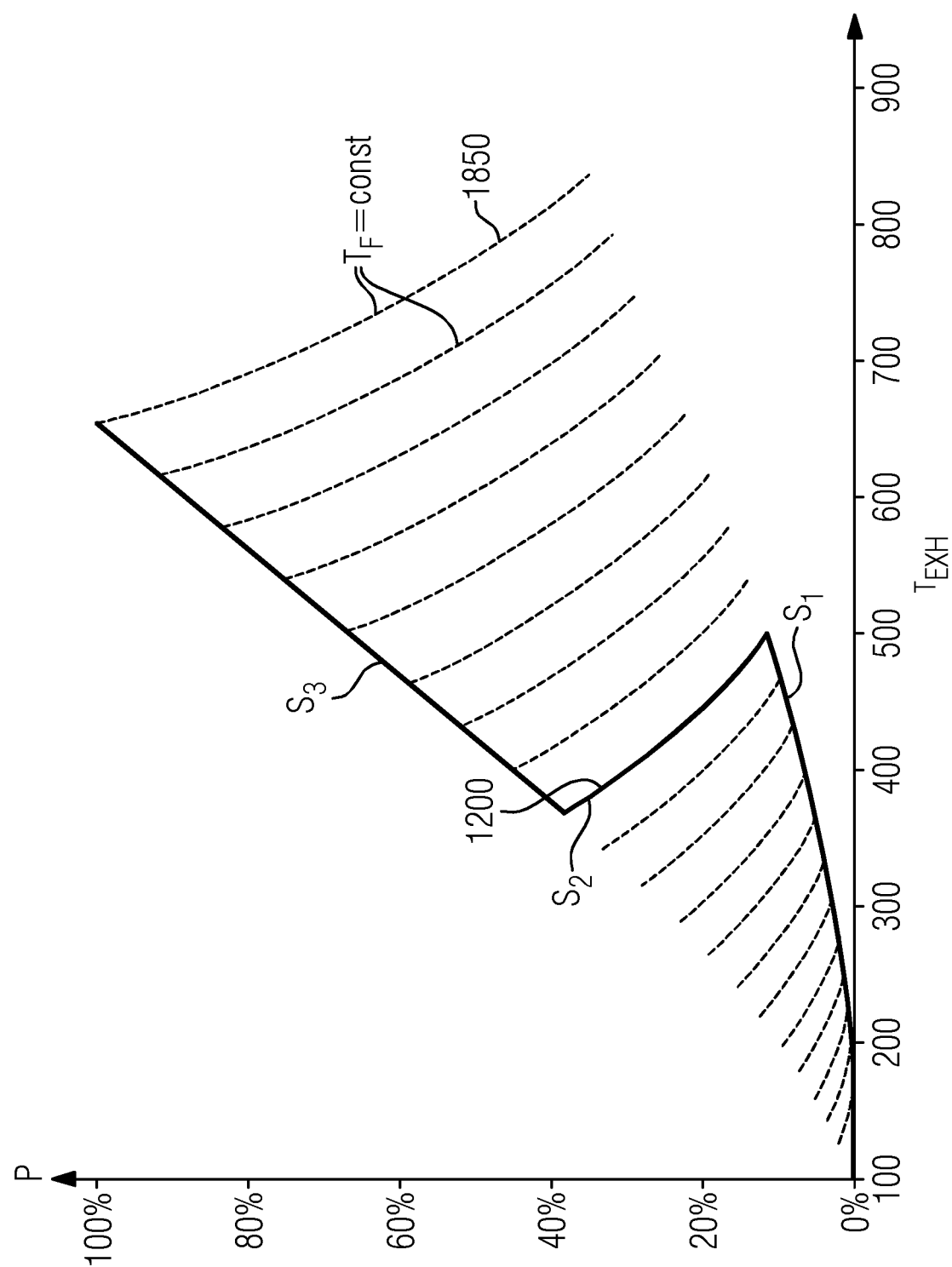
Figure 3:
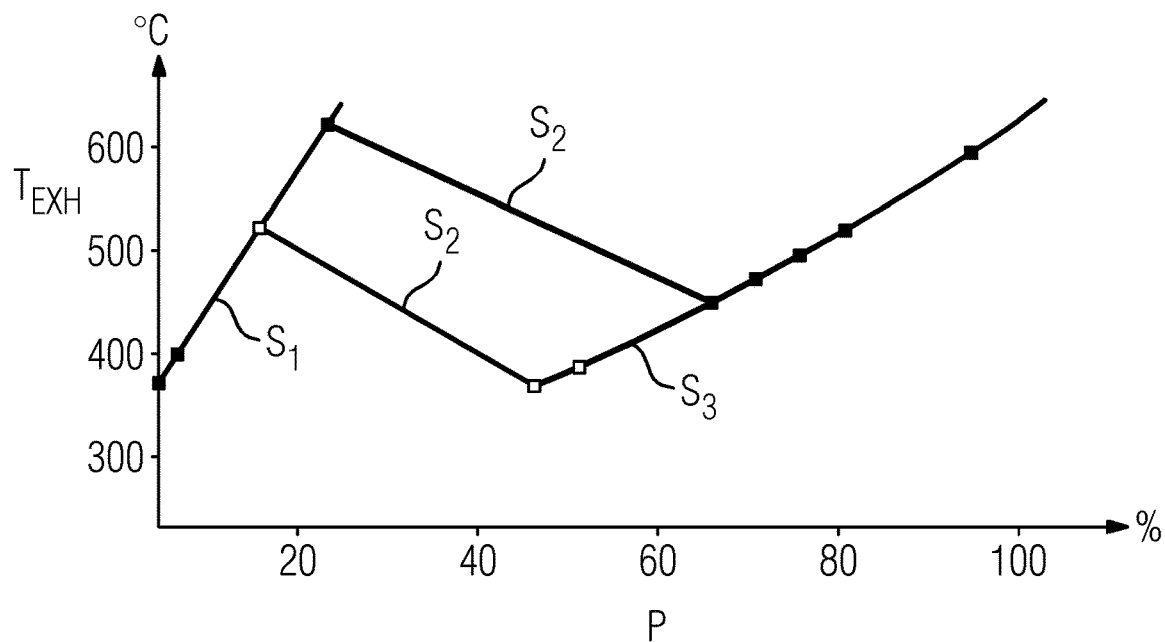
Figure 4:
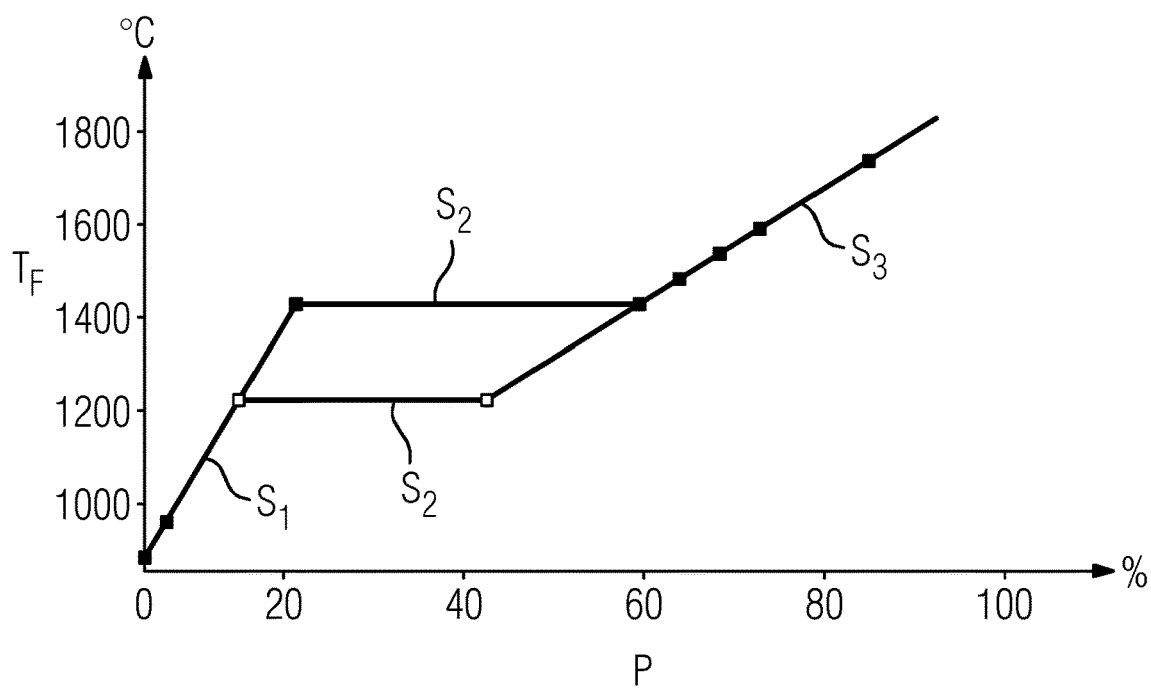

These and other advantages of the invention will be more apparent from the following description in view of the drawings that show:

FIG. 1 a schematic diagram of a combined cycle power plant;

FIG. 2 a new start-up profile of a gas turbine engine according to the present invention in a diagram showing the power of gas turbine engine over the exhaust temperature;

FIG. 3 in a diagram two new start-up profiles according to the present invention in a diagram showing the exhaust temperature over the gas turbine power of the gas turbine engine; and FIG. 4 in a diagram the development of a combustor firing temperature over the power of a gas turbine engine for two new start-up profiles according to the present invention.

Referring to FIG. 1 an abstract, schematic drawing of a combined cycle power plant 2 is shown. In the figure a gas turbine engine 4 and a steam turbine engine 6 are shown.

The gas turbine engine 1 comprises an inlet 8, a compressor 10, a combustor 12 and a turbine 14. A fuel 16 is supplied to the combustor 12 as indicated by an arrow. A fluid which is exhausted by the turbine 14 is identified as exhaust fluid 18.

The exhaust fluid 18 is provided to a heat exchanger 20, in particularly a heat recovery steam generator (HRSG). In the HRSG 20 all of the heat recovered from the exhaust fluid 18 is converted into high pressure steam 22. This steam 22 is used to drive the steam turbine engine 6 which converts the energy of the steam to mechanical energy, which in its turn is converted into electrical power.

The gas turbine engine 4 is driving a first generator 24, so that the mechanical load on the gas turbine engine 4 is converted in the first generator 24 into electrical power. The steam turbine engine 6 is driving a second generator 26. Alternatively mechanical components could be driven.

As an alternative to the power plant design shown in FIG. 1, the combined cycle power plant 2 may be designed as a single shaft combined cycle having the gas turbine engine 4 and the steam turbine engine 6 on one shaft line, both driving a common generator.

A steam exhaust 28 passes through a condenser 30 and water 32 coming from condenser 28 is fed into the HRSG 20.

The steam turbine engine 6 comprises for example a low, a medium and a high steam turbine section which are not shown in FIG. 1.

A control unit 34 is simply indicated by a rectangle. A single or several control units may be present. The control unit 34 may control all shown components or only a subset.

In FIG. 2 the method for starting up a gas turbine engine 4 of a combined cycle power plant 2 is visualized by means of a diagram showing the load P [%] as percent ratio of the base load generated by gas turbine engine 4 over an exhaust temperature $T_{EXH}$ [° C.] of the turbine 14. The dashed lines within the diagram represent isothermal lines for different firing temperatures $T_F$ in the combustor 12.

Starting at minimum load in the first step $S_1$ the profile follows the traditional path, whereby adjustable inlet guide vanes located in the compressor 10 are kept in the fully closed position. At low loads, the CO emission is very high, this is why it is preferable to keep the combustion temperature high and to minimize the exhaust flow 18 by keeping the adjustable inlet guide vanes closed. In this case, the start position of the adjustable inlet guide vanes corresponds to the fully closed position, in which the mass flow of air 8 to the compressor 10 is minimized.

When firing temperature $T_F$ of about 1200° C. is reached at a turbine load between 10% to 20% of the base load, in the second step $S_2$ the firing temperature $T_F$ is kept constant and the load on the gas turbine engine 4 is increased up to about 40% of the base load, while the adjustable inlet guide vanes are opened. This results in a decrease of the exhaust temperature $T_{EXH}$ from about 500° C. to about 375° C. Thus, the thermal stress on the HRSG 20 components is alleviated and at the same time the firing temperature $T_F$ remains CO-compliant at the level of about 1200° C.

Once an end position of the adjustable inlet guide vanes is reached at a firing temperature=1200° C., whereby in the example shown in FIG. 2 the end position corresponds to a fully open position for providing the maximum mass flow of air 8 into the compressor 10, in the third step $S_3$ the load of the gas turbine engine 4 is increased. In the third step $S_3$ the gas turbine engine 4 reaches its base load. The power of the gas turbine engine 4 increases to 100% load, the firing temperature $T_F$ reaches approximately 1850° C. and the exhaust temperature $T_{EXH}$ is about 680° C.

The profile of the temperature development of the method as shown in FIG. 2 is characterized by "sliding backwards" along the constant firing temperature $T_F$ in the range between about 15% and 40% of the base load, which results in a reduction of the exhaust temperature $T_{EXH}$ with increasing power, while the firing temperature $T_F$ is kept CO-compliant.

A profile of the temperature development of the method according to the present invention is shown in FIG. 3, whereby the x-axis represents the engine load P [%] as percent ratio of the base load of the gas turbine engine 4 and the y-axis represents the exhaust temperature $T_{EXH}$ [° C.]. The flexibility of the new loading strategy is illustrated by two different firing temperatures $T_F$ (1200° C. and 1400° C.) in step $S_2$. Depending on the CO emission regulation one of these firing temperatures $T_F$ (or a different CO-compliant firing temperature $T_F$) may be applied, resulting in an offset of the exhaust temperature profile while startup.

The corresponding relationship of the firing temperature $T_F$ [° C.] and the gas turbine load P [%] as percent ratio of the base load is shown in FIG. 4, whereby the horizontal lines show step $S_2$ of the loading strategy—the maintenance of a constant firing temperature $T_F$.

The invention claimed is:

1. A method for starting up a gas turbine engine of a combined cycle power plant, the gas turbine engine including a compressor, a combustor and a turbine, the compressor providing compressed air to the combustor for combustion with a fuel to produce a working fluid and the turbine receiving the working fluid to produce power; the compressor comprising adjustable inlet guide vanes, the adjustable inlet guide vanes being adjustable between a fully closed position for minimizing the mass flow of air into the compressor and a fully open position for providing the maximum mass flow of air into the compressor; wherein the method comprises the steps of:

step 1: applying load to the gas turbine engine and increasing the load until a predetermined combustor firing temperature is reached, while keeping the adjustable inlet guide vanes in a start position adapted to reduce the mass flow of air into the compressor, whereby the predetermined combustor firing temperature is chosen to be an emission-compliant temperature, step 2: further increasing the load of the gas turbine engine while opening the adjustable inlet guide vanes and keeping the predetermined combustor firing temperature constant until the inlet guide vanes reach an end position adapted to increase the mass flow of air into the compressor, step 3: further increasing the load of the gas turbine engine while keeping the adjustable inlet guide vanes in the end position until a predetermined load of the gas turbine engine is reached.

2. A method according claim 1, wherein the predetermined combustor firing temperature is between 1000° C. and 1850° C.

3. A method according to claim 1, wherein in step 3 the predetermined load is a base load of the gas turbine engine.

4. A method according to claim 1, wherein in step 1 the start position of the adjustable inlet guide vanes is the fully closed position.

5. A method according to claim 1, wherein in step 3 the end position of adjustable inlet guide vanes is the fully open position.

* * * * *